G. OTTE.
ADDITIONAL PULLEY RIM.
APPLICATION FILED JUNE 2, 1920.

1,379,280.  Patented May 24, 1921.

Witness
Thos. W. Riley

Inventor
George Otte
By
Attorney

UNITED STATES PATENT OFFICE.

GEORGE OTTE, OF SAND SPRINGS, MONTANA.

ADDITIONAL PULLEY-RIM.

1,379,280.     Specification of Letters Patent.     Patented May 24, 1921.

Application filed June 2, 1920. Serial No. 385,879.

*To all whom it may concern:*

Be it known that I, GEORGE OTTE, citizen of the United States, residing at Sand Springs, in the county of Gasfield and State of Montana, have invented certain new and useful Improvements in Additional Pulley-Rims, of which the following is a specification.

My invention relates to attachments to pulleys. The object is to provide means whereby the periphery of a mounted pulley (one already in place upon a shaft) may be increased by the addition of my device.

Another object of my invention is to simplify the equipment need on machines where it is desirable to change pulley diameters to vary respective speeds. By having several rims of the required diameters constructed as I will hereafter explain, a standard sized pulley of the smaller required diameter may at all times remain upon the machine. To increase the periphery of this standard pulley in order to attain a greater speed the necessary rim is attached as I have explained hereafter.

Figure 1:
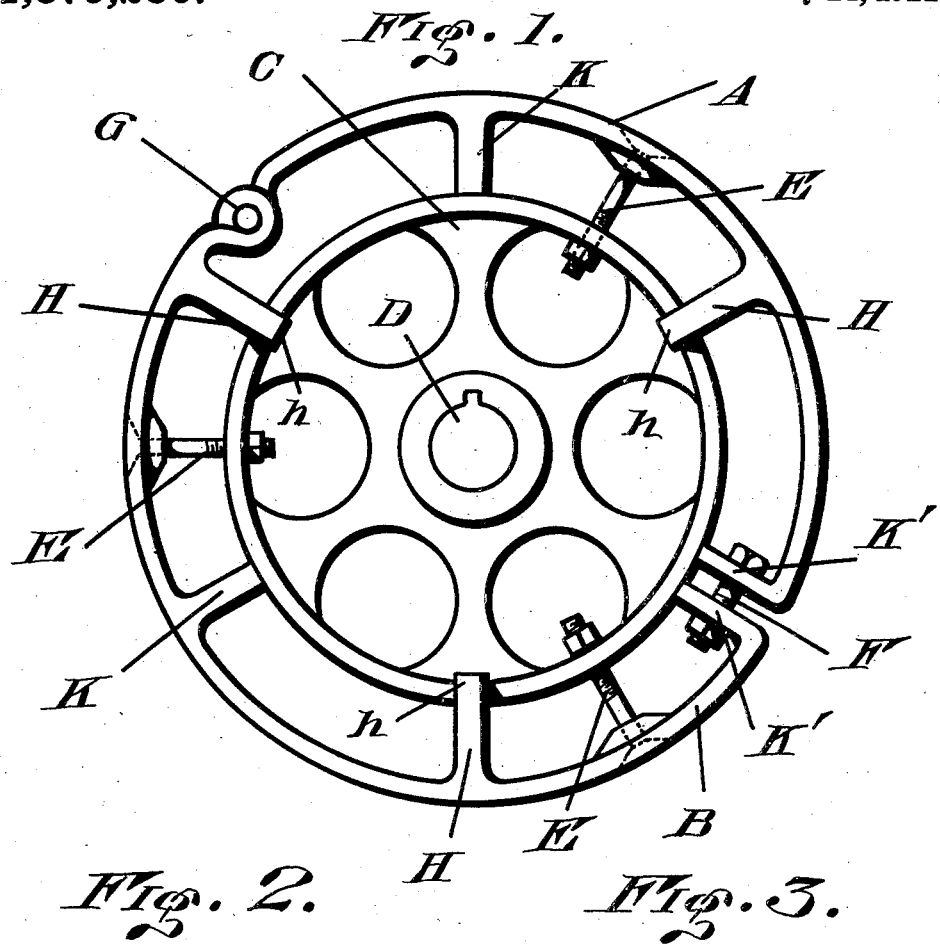
Figure 2:
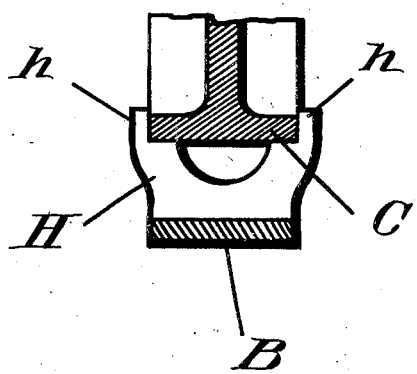
Figure 3:
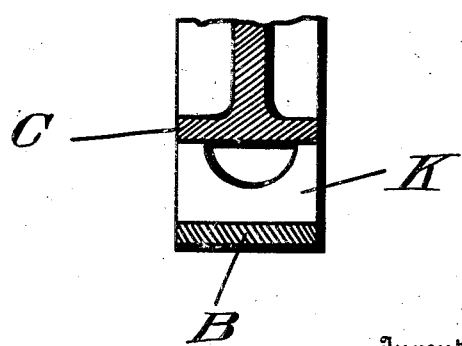

In the accompanying drawing forming a part of this specification Figure 1, is a vertical sectional view showing my device secured to the periphery of a standard pulley. Fig. 2 shows shape of large spokes with lugs for side thrust. Fig. 3 shows short spokes.

The rims A and B are provided with a plurality of large spokes H having extension lugs $h$ which are adapted to overlap the peripheral sides of the tread of the standard pulley to prevent side play and they are also adapted to perform the function of spokes as are also the small spokes K, of which I also provide a plurality. At the yoke or point where rims A and B are connected the ends of the said rims A and B are bent to form short spokes K at the same time providing grips $K^1$, for the bolt F. The rims A and B are provided with a hinge G so that they may be quickly slipped into place. The letter E shows bolts which enter countersunk and reinforced portions of the rims A and B as shown in Fig. 1. C denotes a standard pulley keyed or shrunk upon a shaft D.

It is evident that my device may be made with an endless periphery equipped with short spokes K and bolts E. It is also evident that the opposed ends $K^1$, of my auxiliary rim form advantageous grips whereby I am enabled by means of the bolt F to securely clamp and bind my detachable rim to the tread of the standard pulley.

Having described my invention, what I claim and desire to secure by Letters Patent is:

1. A pulley attachment of the class described comprising an auxiliary rim provided with spokes, having yoke shaped bearings adapted to bear upon the tread of a standard pulley and embrace its edges, said rim having also clamping bolts connecting said rim and tread and short spokes adjacent to said bolts adapted to bear upon the tread of the standard pulley.

2. A pulley attachment of the class described comprising a detachably connected auxiliary rim, formed of hinged sections, spokes having yoke shaped bearings adapted to span and bear upon the tread of a standard pulley, grips formed integral with the opposed ends of said hinged sections and means for actuating said grips to bind sections to said tread.

3. A pulley attachment of the class described comprising a detachably connected rim provided with a series of short spokes adapted to bear upon the tread of a standard pulley and having arranged adjacent to and intermediate of said spokes, a series of clamping bolts connecting said rim and tread.

In testimony whereof I affix my signature.

GEORGE OTTE.